(12) United States Patent
Chen et al.

(10) Patent No.: US 6,976,303 B2
(45) Date of Patent: Dec. 20, 2005

(54) SYSTEM AND TOOL FOR MOUNTING A CONNECTING DEVICE TO A SUBSTRATE

(75) Inventors: Wenzong Chen, Naperville, IL (US); Thomas R. Marrapode, Naperville, IL (US); Igor Grois, Northbrook, IL (US); Jeffrey P. Myczek, Naperville, IL (US)

(73) Assignee: Molex Incorporated, Lisle, IL (US)

( * ) Notice: Subject to any disclaimer, the term of this patent is extended or adjusted under 35 U.S.C. 154(b) by 411 days.

(21) Appl. No.: 10/279,629

(22) Filed: Oct. 24, 2002

(65) Prior Publication Data

US 2004/0078961 A1 Apr. 29, 2004

(51) Int. Cl.[7] .............................................. B23P 19/00
(52) U.S. Cl. ............................ 29/739; 29/729; 29/748; 29/758; 29/759; 29/760; 29/842; 81/44; 439/923
(58) Field of Search .......................... 29/729, 739–748, 29/750–754, 757–761, 842; 81/13, 44, 64, 121.1, 124.2, 129, 176.1, 176.15, 176.2; 411/102, 104; 439/359, 923; 7/125, 130, 137

(56) References Cited

U.S. PATENT DOCUMENTS

| | | | | |
|---|---|---|---|---|
| 4,852,925 A | * | 8/1989 | Lodin ........................... | 29/758 |
| 5,228,873 A | * | 7/1993 | Hirai ........................... | 439/607 |
| 5,502,887 A | * | 4/1996 | Gonzales ..................... | 29/764 |
| 5,937,716 A | * | 8/1999 | Klann .......................... | 81/419 |
| 5,954,466 A | * | 9/1999 | Coffey et al. ............... | 411/119 |
| 6,779,256 B2 | * | 8/2004 | Kappel et al. ................ | 29/764 |

FOREIGN PATENT DOCUMENTS

JP          06-060924          *   4/1994   ............ H01R/9/09

* cited by examiner

*Primary Examiner*—Minh Trinh
*Assistant Examiner*—Donghai D. Nguyen
(74) *Attorney, Agent, or Firm*—Romi N. Bose

(57) ABSTRACT

A system is provided for mounting a connecting device to a substrate. A connector housing is located at one side of the substrate, and a threaded fastening nut is engaged on the housing. A threaded fastener is engaged with the opposite side of the substrate and extends therethrough for tightening the nut toward the substrate in response to rotating the fastener. An assembly tool holds the fastening nut against rotation as the fastener is rotated. The tool includes a first portion for engaging at least a part of the housing to properly position the tool. A second portion of the tool engages the fastening nut to prevent rotation thereof. The second portion of the tool is aligned with the fastening nut automatically in response to engaging the first portion with the housing.

22 Claims, 6 Drawing Sheets

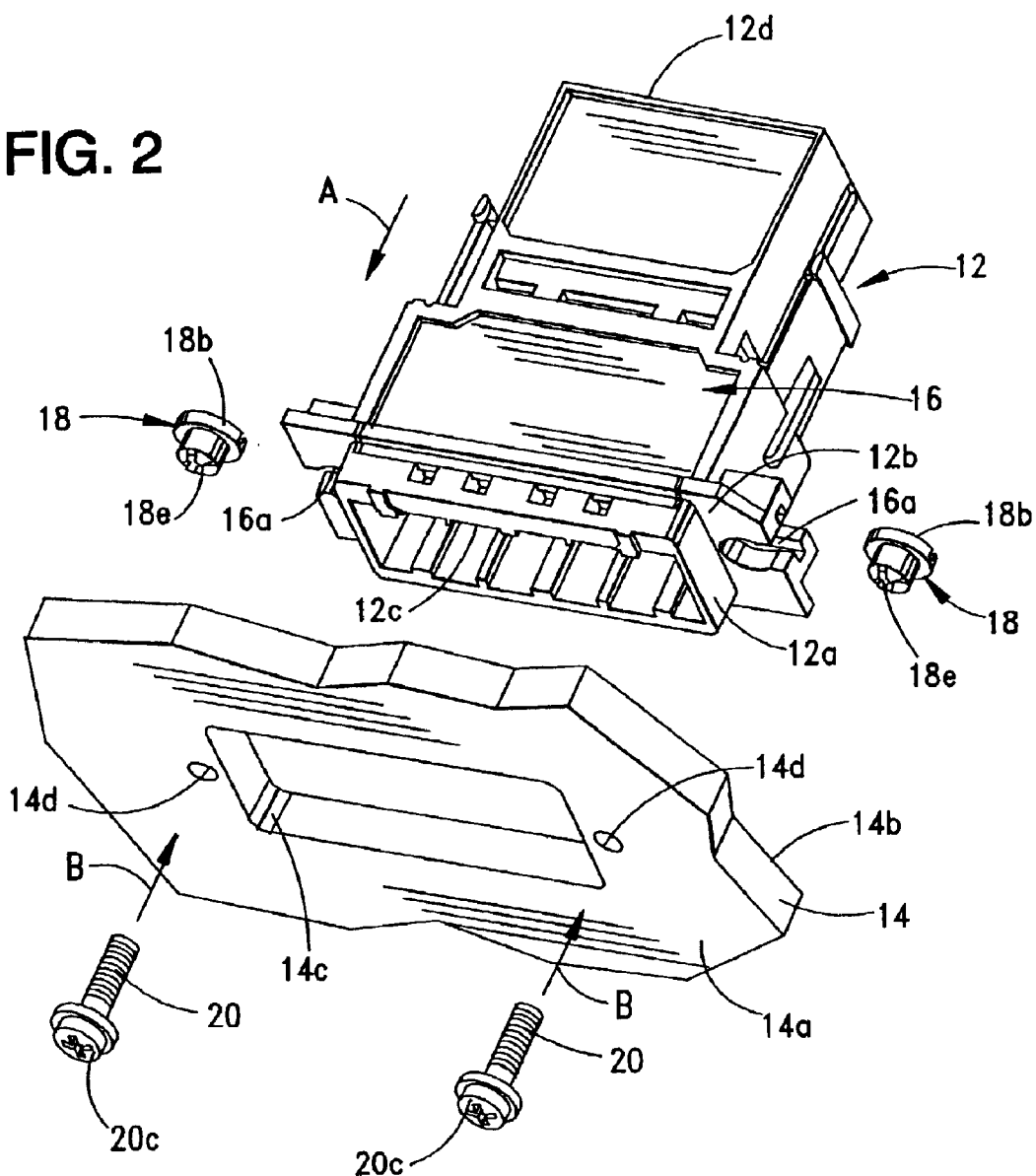
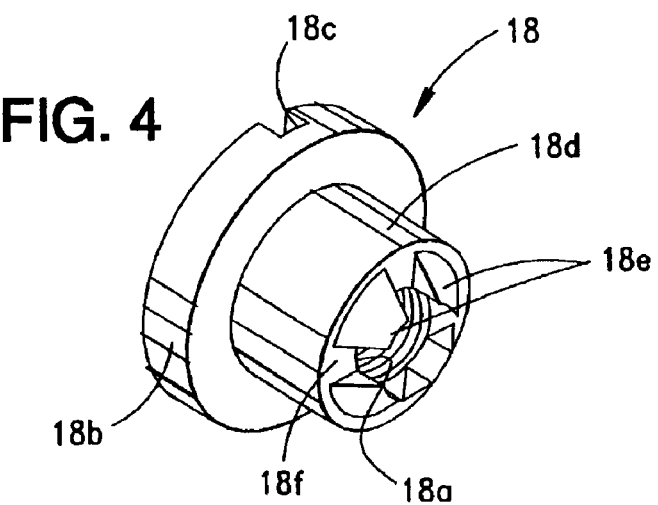

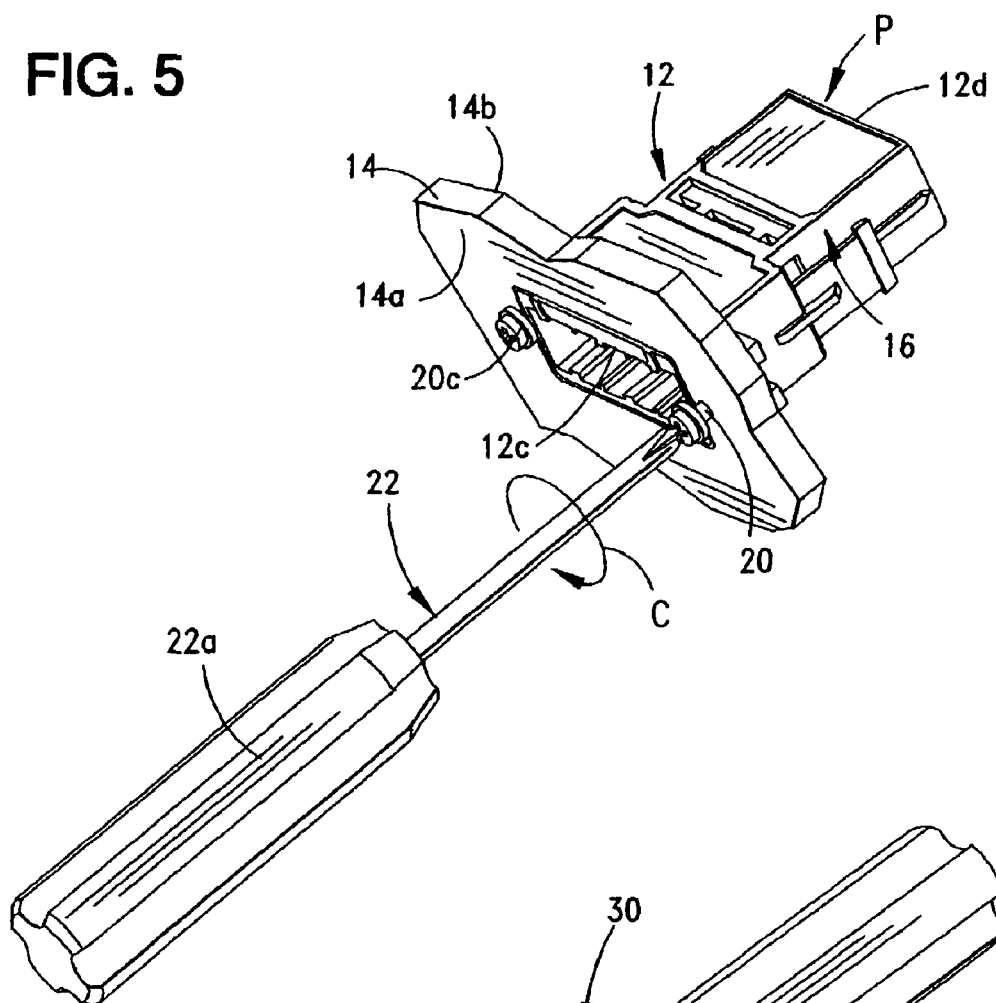
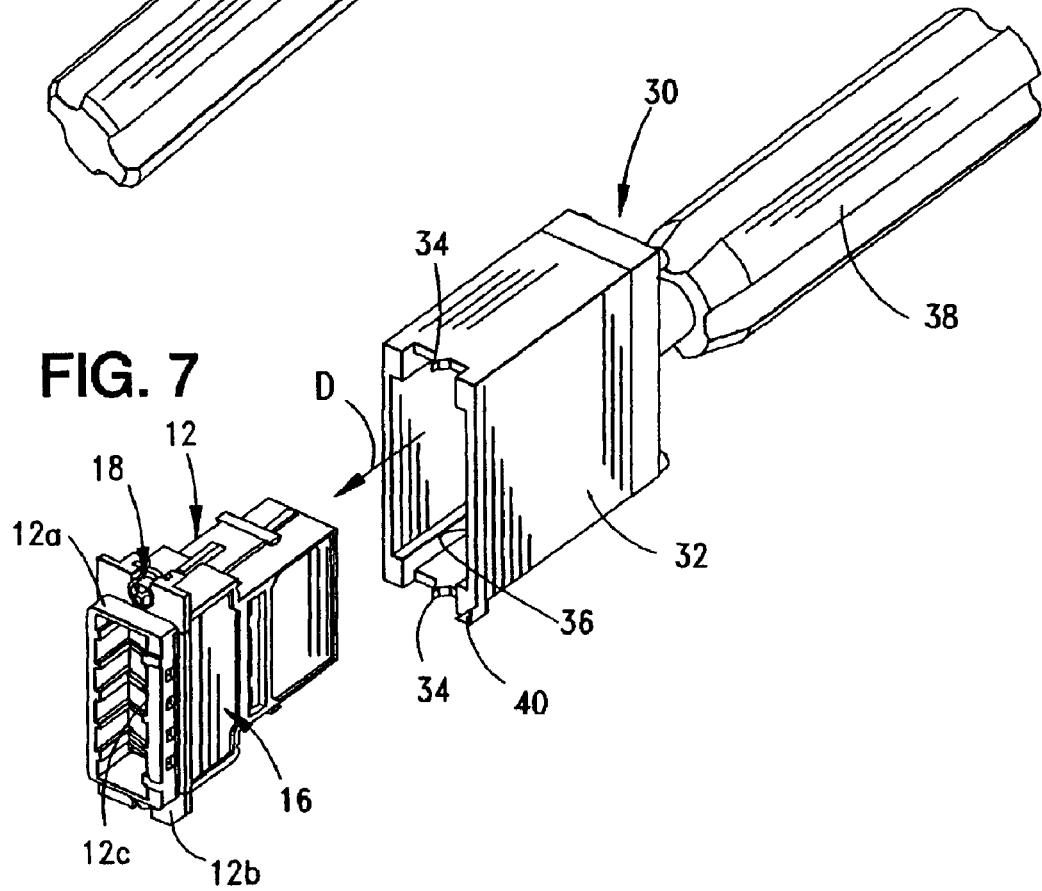

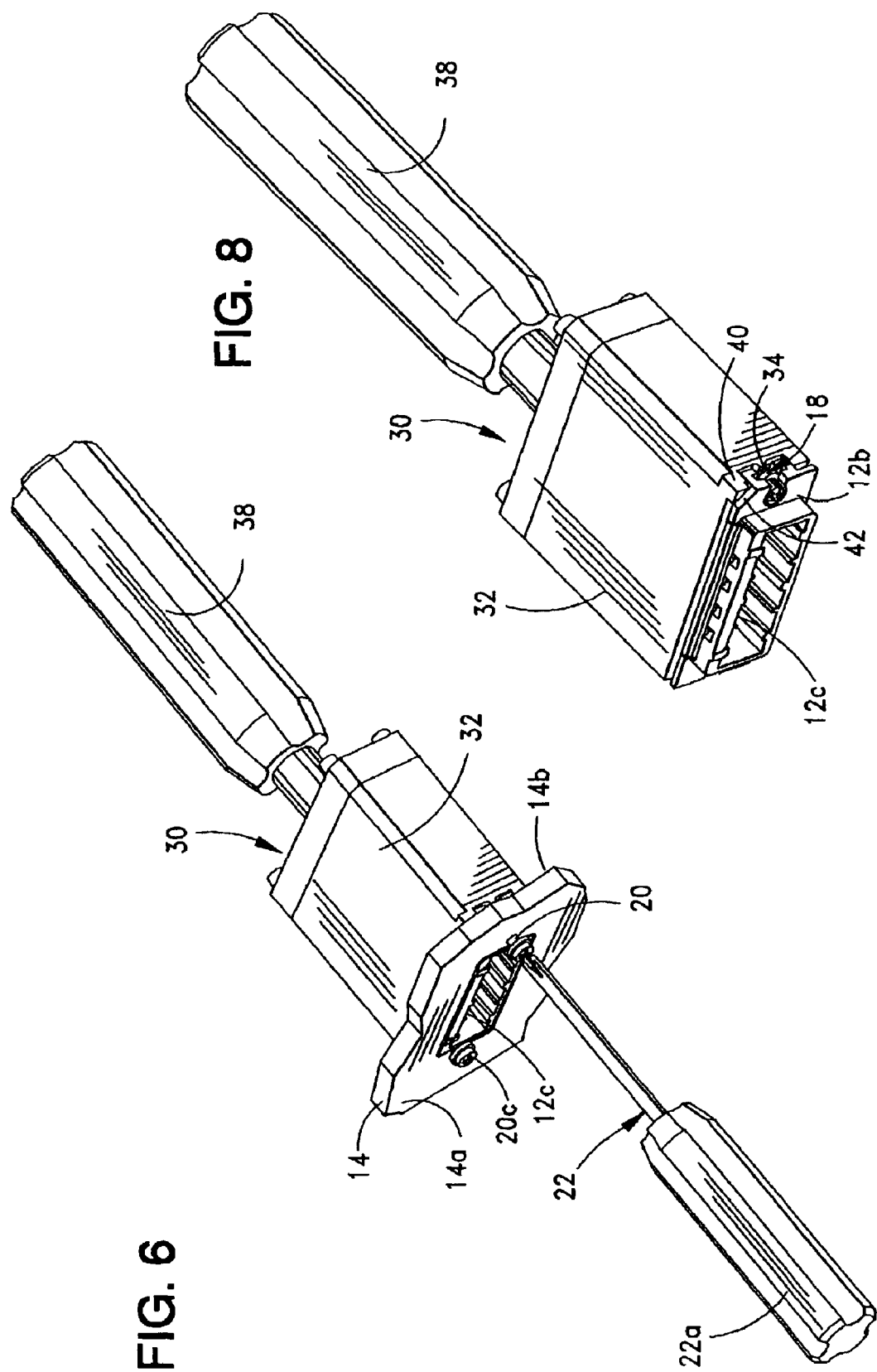

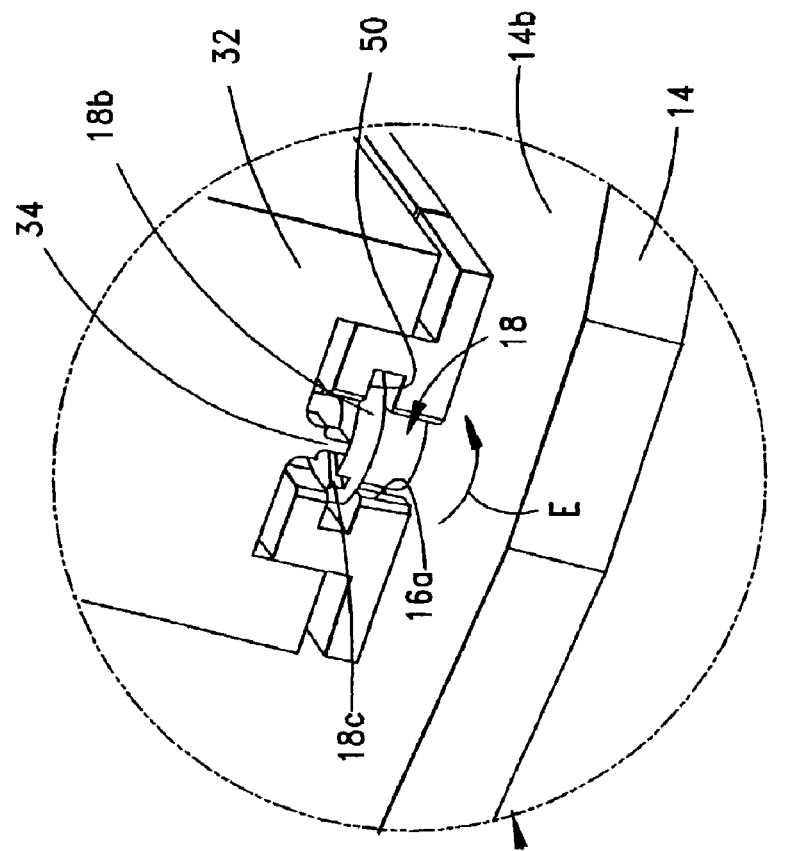
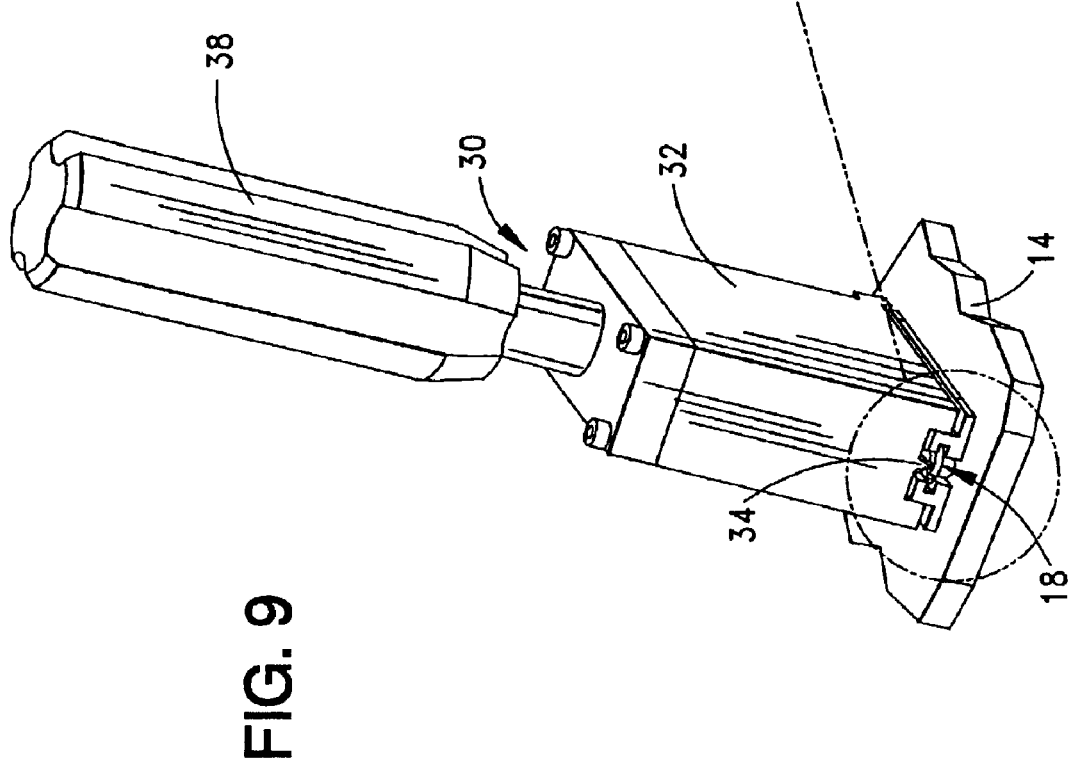
FIG. 9
FIG. 9A

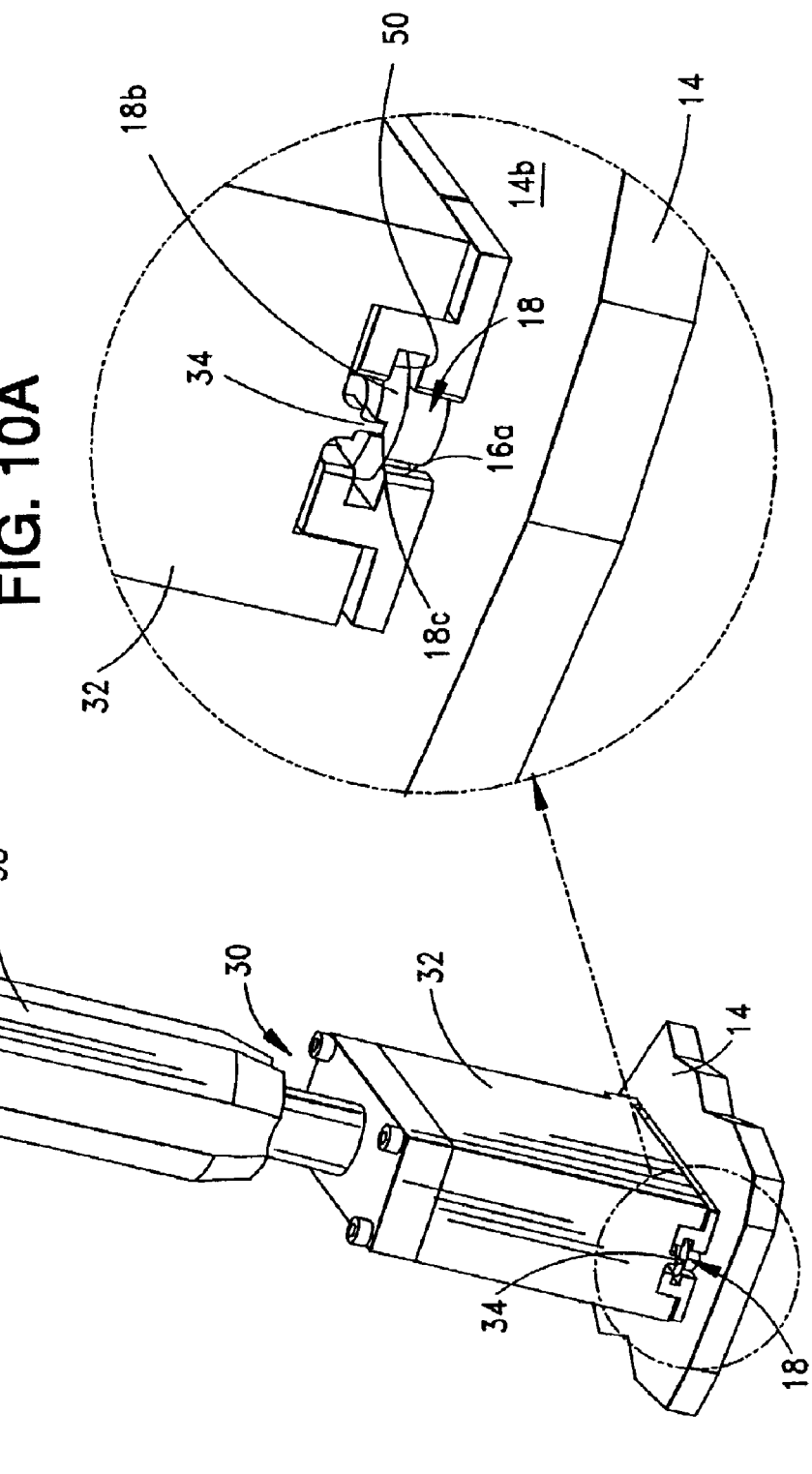

SYSTEM AND TOOL FOR MOUNTING A CONNECTING DEVICE TO A SUBSTRATE

FIELD OF THE INVENTION

This invention generally relates to the art of connector assemblies and, particularly, to a system and/or tool for mounting a connecting device to a substrate.

BACKGROUND OF THE INVENTION

Fiber optic connectors of a wide variety of designs have been employed to terminate optical cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connection device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or other substrate.

Various problems continue to be encountered in designing fiber optic connector assemblies or other connector assemblies, including applications involving backplanes, motherboards, daughterboards and like substrates, panels or the like. Such problems include properly mounting a connector assembly on a substrate. For instance, a connector assembly, an adapter or other connecting device may be mounted through an aperture from a back side of a substrate or panel. Screw-type fasteners are inserted through holes in the substrate from the front side thereof for engaging threaded fastening nuts on the back side of the substrate. Means must be provided to prevent rotation of the fastening nut as the fastening screws are tightened. However, with the screws being inserted through holes from a front side of the substrate, and the fastening nuts being located on a back side of the substrate, this is extremely difficult and even impossible in some applications, particularly in the field. The present invention is directed to solving these problems by a unique system and/or tool for facilitating mounting a connecting device to a substrate by means of rotatable or threaded fasteners.

SUMMARY OF THE INVENTION

An object, therefore, of the invention is to provide a new and improved system and/or assembly tool for mounting a connecting device to a substrate by readily preventing rotation of a fastening nut so that a threaded fastener is easily rotatably tightened to the nut.

In the exemplary embodiment of the invention, the system includes a connector housing at one side of the substrate. A threaded fastening nut is engaged on the housing. A threaded fastener is engaged with the opposite side of the substrate and extends therethrough for tightening the nut toward the substrate in response to rotating the fastener. The invention contemplates an assembly tool for holding the fastening nut against rotation as the fastener is rotated. The tool includes a first portion for engaging a portion of the housing to properly position the tool, and a second portion for engaging the fastening nut to prevent rotation thereof. The second portion is aligned with the fastening nut automatically in response to engaging the first portion with the housing.

According to one aspect of the invention, the first portion of the assembly tool is structured for embracing a portion of the housing. In the preferred embodiment, the first portion of the tool comprises a shroud for surrounding a portion of the housing. The connector housing herein is orthogonal (rectangular) in shape, and the shroud defines a complementary orthogonal receptacle for receiving and embracing the housing.

According to another aspect of the invention, at least a pair of the fastening nuts are spaced apart on the connector housing. A pair of the fasteners are respectively threadingly engageable with the fastening nuts. The tool includes a pair of said second portions at opposite sides of the shroud and respectively engageable with the fastening nuts to simultaneously prevent rotation thereof.

Other features of the invention conclude a handle on the tool for manual grasping by an operator. Complementary interengaging keying means are provided between the connector housing and the tool to ensure that the tool is properly positioned on the housing.

In an alternative embodiment of the invention, the threaded fastening nut(s) is provided with teeth for digging into the substrate upon tightening of the nut toward the substrate by the threaded fastener. Such a toothed nut would eliminate the necessity of the tool.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an exploded perspective view of the components of FIG. 1, incorporating toothed fastening nuts according to a first embodiment of the invention;

FIG. 4 is an enlarged perspective view of the toothed end of one of the toothed fastening nuts;

FIG. 5 is a perspective viewing showing a screwdriver type tool for securing the connecting device to the substrate using the toothed fastening nuts;

FIG. 6 is a perspective view of a system according to a second embodiment of the invention wherein an assembly tool is used to prevent rotation of the fastening nuts;

FIG. 7 is a perspective view of the assembly tool and connecting device of FIG. 6, removed from the substrate;

FIG. 8 is a view similar to that of FIG. 7, with the tool embracing the connecting device;

FIGS. 9 and 9A are perspective views looking at the back side of the substrate and showing the tool about to be engaged with the fastening nuts; and FIGS. 10 and 10A are views similar to that of FIGS. 9 and 9A, but showing the tool fully engaged with the fastening nuts.

DETAILED DESCRIPTION OF THE PREFERRED EMBODIMENTS

Figure 1:
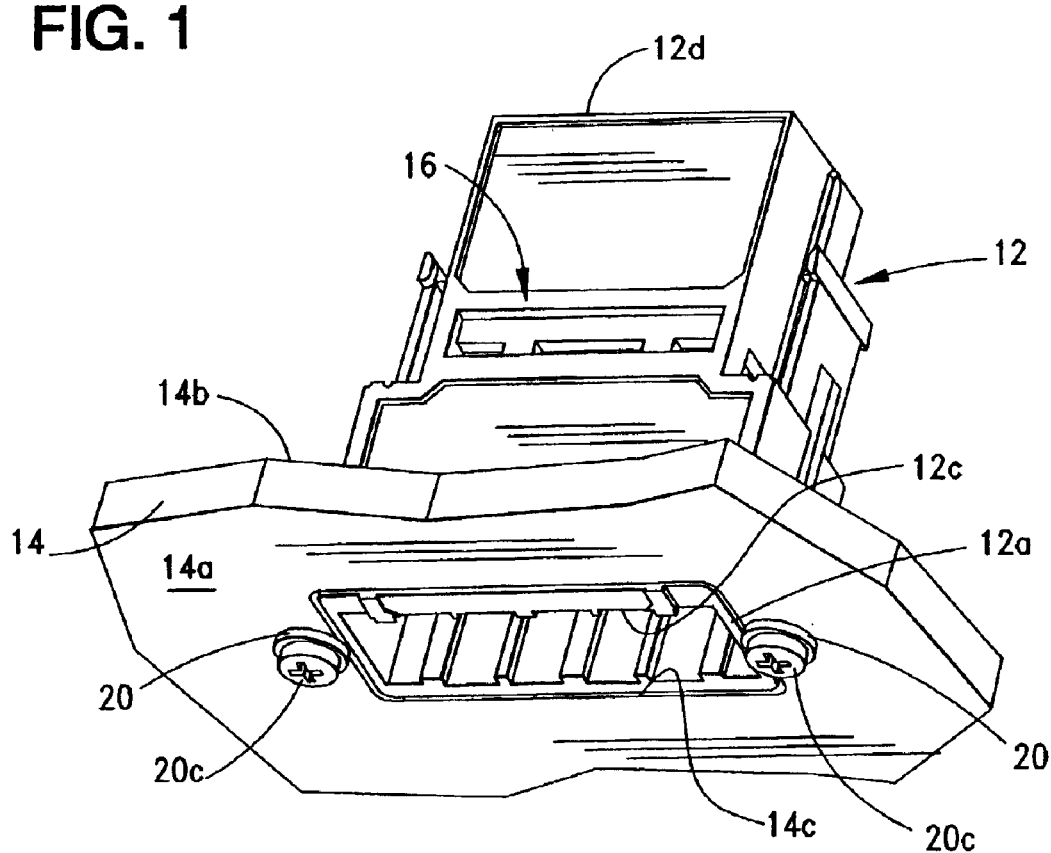
FIG. 1 is a perspective view of a connecting device (adapter) mounted in an aperture in a substrate and incorporating the fastener system of the invention.

Referring to the drawings in greater detail, and first to FIGS. 1 and 2, the embodiments of the invention are shown in a system and tool for mounting a connecting device, generally designated 12, to a substrate 14. The substrate has a front side 14*a* and a back side 14*b*. The substrate includes a rectangular aperture 14*c* along with a pair of through holes 14*d* spaced slightly outwardly from opposite ends of the rectangular aperture.

Connecting device 12 is in the form of an adapter which includes a shroud portion 12*a* for insertion into aperture 14*c* from back side 14*b* of the substrate in the direction of arrow "A" (FIG. 2) until an outwardly projecting flange 12*b* abuts against back side 14*b* of the substrate, with the shroud portion in the aperture as seen in FIG. 1.

At this point, it should be understood that the system and/or assembly tool of the invention is applicable for mounting a wide variety of connecting devices to a wide variety of substrates ranging from simple panels to backplanes, motherboards, daughterboards or the like. In the exemplary embodiment, connecting device 12 is an adapter which includes an open front end 12*c* and an open rear end 12*d* (not visible in the drawings). Open front end 12*c* is designed for receiving a plurality of fiber optic connector modules which are not shown in the drawings. Open rear end 12*d* is designed for receiving a daughterboard connector assembly which, itself, includes a plurality of fiber optic connector modules for mating with the fiber optic connector modules inserted into the open front end of the adapter. Details of such a connector assembly are shown in U.S. Pat. No. 6,406,192, dated Jun. 18, 2002, which is assigned the assignee of the present invention and which is incorporated herein by reference. However, it again should be understood that the system and/or assembly tool of the invention herein is equally applicable for a wide range of applications other than the specific adapter application shown in the drawings.

With that understanding, connecting device or adapter 12 includes a housing, generally designated 16, which has a pair of receptacles 16*a* at opposite sides thereof for receiving a pair of internally threaded fastening nuts, generally designated 18 (FIG. 2). A pair of externally threaded fasteners or bolts 20 are inserted in the direction of arrows "B" through holes 14*d* in substrate 14 for threadingly engaging fastening nuts 18 and tightening the nuts toward substrate 14 in response to rotating the fastener bolts. The bolts have enlarged head ends 20*c* for engaging front side 14*a* of the substrate and for receiving a Phillips-type screwdriver.

Figure 3:
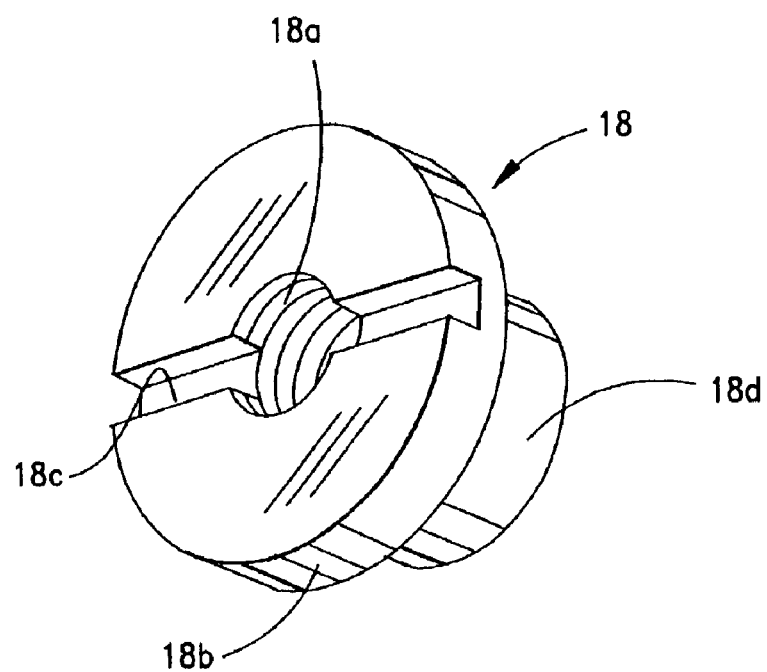
FIG. 3 is an enlarged perspective view of the head end of one of the fastening nuts.

Referring to FIGS. 3 and 4 in conjunction with FIG. 2, each fastening nut 18 includes an internally threaded hole 18*a* for receiving one of the externally threaded fastener bolts 20. Each fastening nut includes an enlarged head end 18*d* having a slot 18*c* therein. Each fastening nut further includes a reduced-diameter shank end 18*d* which has a plurality of teeth 18*e* projecting axially from an end face 18*f* thereof. The teeth are provided for biting into back side 14*b* of substrate 14.

FIG. 5 shows a Phillips-type screwdriver, generally designated 22, for engaging the head ends 20*c* of one of the externally threaded fastener bolts 20. The screwdriver has a handle 22*a* and is rotated in the direction of arrow "C" to rotate the fastener bolt and draw the respective fastening nut 18 toward back side 14*b* of substrate 14. Some pressure must be applied to adapter 12, in the direction as shown by arrow P in FIG. 5, during the process especially when bolt 20 and nut 8 are first engaged. When the nut is tightened against the back side of the substrate, teeth 18*e* at the end face of the nut bite into the surface of the substrate further at the back side thereof. In essence, the teeth on fastening nut 18 prevent rotation of the nuts so that an operator can simply rotate fastener bolts 20 to mount adapter 12 to the substrate, in that enlarged head ends 18*b* of the fastening nuts are captured within receptacles 16*a* at opposite sides of housing 16 of the adapter.

There are applications wherein the material of substrate 14 is so hard that teeth 18*e* of fastening nuts 18 cannot bite into the material of the substrate. Metal materials are but one example. In that event, the invention contemplates a system and/or assembly tool for embracing connecting device or adapter 12 and simultaneously holding the fastening nuts against rotation as the fastener bolts are rotated. Such a system and/or assembly tool are shown in FIGS. 6–10. Like reference numerals are applied in those FIGS. corresponding to like components already described above in relation to FIGS. 1–5.

More particularly, FIGS. 6–8 show an assembly tool, generally designated 30, which generally is effective for embracing connecting device or adapter 12 and simultaneously engaging and preventing rotation of fastening nuts 18. FIG. 6 shows the tool embraced with the adapter at back side 14*b* of substrate 14 as the Phillips-type screwdriver 22 is engaged with one of the fastener bolts at front side 14*a* of the substrate. FIG. 7 shows the tool and the adapter isolated from the substrate. FIG. 8 shows the tool embracing the adapter and again isolated from the substrate.

Generally, assembly tool 30 includes a first portion 32 for engaging a portion of housing 16 of adapter 12 to properly position the tool, and a second portion or portions 34 for engaging the fastening nut(s) to prevent rotation thereof. In essence, the second portions 34 are aligned with fastening nuts 18 automatically in response to engaging first portion 32 with housing 16 of the adapter.

More particularly, first portion 32 of tool 30 is in the form of a shroud which surrounds housing 16 of adapter 12. Preferably, the shroud is of the same configuration as the housing. Therefore, in the illustrated embodiment, with housing 16 of adapter 12 being rectangular in shape or cross-section, shroud 32 has a receptacle 36 of the same rectangular or orthogonal shape as the adapter housing. The tool can be assembled in the direction of arrow "D" (FIG. 7) over the housing as shown in FIGS. 6 and 8. Second portion(s) 34 of tool 30 are configured for engaging fastening nuts 18 to prevent rotation thereof. In the illustrated embodiment, the fastening nuts have elongated slots 18*c* in head ends 18*b* thereof. Therefore, second portions 34 of assembly tool 30 are blade-like projections simulating an ordinary flat screwdriver. When shroud 32 is positioned over housing 16 of adapter 12, blades 34 are automatically aligned with enlarged head ends 18*b* of fastening nuts 18. A handle 38 may be provided on assembly tool 30, similar to the handle 22*a* of screwdriver 22, for manual grasping by an operator.

FIG. 8 shows a feature of assembly tool 18 and adapter housing 16 for keying the tool to the housing so that blades 34 are accurately aligned with the heads of fastening nuts 18.

Specifically, FIG. 8 shows a keying boss 40 projecting axially from one corner of shroud 32 of the assembly tool. One corner 42 of flange 12b of adapter 12 is cut-out for receiving keying boss 40. With the other three corners of the flange not being cut-out, shroud 32 can be positioned over the adapter housing in only one given orientation.

FIGS. 9–10A show the operation of assembly tool 30 in engaging each fastening nut 18. Specifically, as the tool is mounted over the adapter housing, blades 34 become aligned with and abut against the top of the fastening nuts as seen in FIG. 9A. However, it can be seen most clearly in FIG. 9A that slot 18c in the head end of the fastening nut is not properly oriented with the respective blade 34. Nevertheless, as the respective fastener bolt 20 is rotated, fastening nut 18 will rotate in the direction of arrow "E" until slot 18c becomes aligned with blade 34 as seen in FIGS. 10 and 10A. With the operator continuing to apply modest pressure on the assembly tool, blade 34 will drop into slot 18c and prevent further rotation of the fastening nut, whereby the respective fastener bolt 20 can tighten the nut toward the substrate.

Finally, the enlarged depictions of FIGS. 9A and 10A also show how enlarged head ends 18b of fastening nuts 18 are captured within slots or grooves 50 in receptacles 16a of the adapter housing to effectively draw the adapter along with the fastening nuts toward the back side of substrate 14.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

What is claimed is:

1. A system for mounting a connecting device to a substrate, comprising:
    a connector housing at one side of the substrate;
    a threaded fastening nut engaged on the housing;
    a threaded fastener engaged with the opposite side of the substrate and extending through the substrate for tightening the nut toward the substrate in response to rotating the fastener; and
    an assembly tool for holding the fastening nut against rotation as the fastener is rotated, the tool including a first portion for engaging a portion of the housing to properly position the tool and a second portion for engaging the fastening nut to prevent rotation thereof, the second portion being aligned with the fastening nut automatically in response to engaging the first portion with the housing.

2. The system of claim 1 wherein said first portion of the tool is structured for embracing said portion of the housing.

3. The system of claim 2 wherein said first portion of the tool comprises a shroud for surrounding said portion of the housing.

4. The system of claim 3 wherein said connector housing is orthogonal in shape and said shroud defines a complementary orthogonal receptacle for receiving and embracing the housing.

5. The system of claim 1 wherein said second portion of the tool comprises a tool head for insertion into a slot in the fastening nut.

6. The system of claim 1 wherein said tool includes a handle for manual grasping by an operator.

7. The system of claim 1, including at least a pair of fastening nuts spaced apart on the connector housing, a pair of fasteners respectively threadingly engageable with the fastening nuts, and said tool includes a pair of second portions respectively engageable with the fastening nuts to simultaneously prevent rotation thereof.

8. The system of claim 7 wherein said first portion of the tool is located between said pair of second portions.

9. The system of claim 1, including complementary interengaging keying means between the connector housing and the tool to ensure that the tool is properly positioned on the housing.

10. A system for mounting a connecting device to a substrate, comprising:
    an orthogonal connector housing at one side of the substrate;
    at least a pair of fastening nuts spaced apart on the connector housing and engaged therewith;
    at least a pair of threaded fasteners engaged with the opposite side of the substrate and extending through the substrate for respectively threadingly engaging the fastening nuts and tightening the nuts toward the substrate in response to rotating the fasteners; and
    an assembly tool for holding the fastening nuts against rotation as the fasteners are rotated, the tool including a shroud defining a complementary orthogonal receptacle for receiving and embracing the orthogonal connector housing, the tool including a pair of engaging portions respectively engageable the fastening nuts to simultaneously prevent rotation thereof, the engaging portions being aligned with the fastening nuts automatically in response to positioning the shroud over the connector housing.

11. The system of claim 10 wherein said engaging portions of the assembly tool comprise tool heads for insertion into a slots in the fastening nuts.

12. The system of claim 10 wherein said tool includes a handle for manual grasping by an operator.

13. The system of claim 10, including complementary interengaging keying means between the connector housing and the tool to ensure that the tool is properly positioned on the housing.

14. An assembly tool for facilitating mounting a connecting device to a substrate wherein the connecting device includes a connector housing at one side of the substrate, a fastening nut engaged on the housing, and a threaded fastener engaged with the opposite side of the substrate and extending through the substrate for tightening the nut toward the substrate in response to rotating the fastener, said assembly tool comprising:
    a first portion for engaging a portion of the housing to properly position the tool;
    a second portion for engaging the fastener nut to hold the fastening nut against rotation as the fastener is rotated; and
    said second portion being aligned with the fastening nut automatically in response to engaging the first portion with the housing.

15. The system of claim 14 wherein said first portion of the tool is structured for embracing said portion of the housing.

16. The system of claim 15 wherein said first portion of the tool comprises a shroud for surrounding said portion of the housing.

17. The system of claim 16 wherein said shroud includes a receptacle which is complementary in shape to the connector housing for receiving and embracing the housing.

18. The system of claim 14 wherein said second portion of the tool comprises a tool head for insertion into a slot in the fastening nut.

19. The system of claim 14 wherein said tool includes a handle for manual grasping by an operator.

20. The system of claim 14 wherein said connecting device includes at least a pair of fastening nuts spaced apart on the connector housing along with a respective pair of fasteners threadingly engageable with the fastening nuts, and said assembly tool includes a pair of second portions respectively engageable with the fastening nuts to simultaneously prevent rotation thereof.

21. The system of claim 20 wherein said first portion of the tool is located between said pair of second portions.

22. The system of claim 14 wherein said assembly tool includes keying means for engaging an appropriate complementary keying means on the connector housing to ensure that the tool is properly positioned on the housing.

* * * * *